United States Patent [19]
Watanabe

[11] Patent Number: 5,539,002
[45] Date of Patent: Jul. 23, 1996

[54] ION EXCHANGE RESINS WITH DECREASED RESISTANCE TO IONIC CONDUCTIVITY

[75] Inventor: Masahhiro Watanabe, No. 2412-8, Wadamachi, Kofu-shi, Yamanashi, Japan

[73] Assignees: Tanaka Kikinzoku Kogyo K.K., Japan; Masahiro Watanabe, Japan; Stonehart Associates Inc., Madison, Conn.

[21] Appl. No.: 230,198

[22] Filed: Apr. 20, 1994

[51] Int. Cl.⁶ .................................................. B01J 47/12
[52] U.S. Cl. ............................................. 521/27; 528/496
[58] Field of Search ............................... 521/27; 528/496

[56] References Cited

U.S. PATENT DOCUMENTS

| | | | |
|---|---|---|---|
| 3,004,904 | 10/1961 | Gregor et al. | 521/27 |
| 4,148,979 | 4/1979 | Asami et al. | 521/27 |
| 4,433,082 | 2/1984 | Grot | 521/27 |
| 4,535,112 | 8/1985 | McCain | 521/27 |
| 4,595,476 | 6/1986 | Bissot | 521/27 |

FOREIGN PATENT DOCUMENTS

| | | | |
|---|---|---|---|
| 53-40696 | 4/1978 | Japan | 521/27 |
| 883100 | 7/1979 | U.S.S.R. | 521/27 |

*Primary Examiner*—Peter F. Kulkosky
*Attorney, Agent, or Firm*—Klauber & Jackson

[57] ABSTRACT

Disclosed is a process of preparing an ion exchange membrane which comprises adding a highly hydrophilic solvent into a solution of an ion exchange resin containing an ion exchange group on the polymer chain, placing the solution into a membrane-forming vessel and forming a membrane by removing the solvent.

The ion exchange membrane prepared in accordance with the present invention exhibits the high degree of orientation so that the ionic conductivity can be elevated to provide the satisfactory cell performance.

4 Claims, 1 Drawing Sheet

ION EXCHANGE RESINS WITH DECREASED RESISTANCE TO IONIC CONDUCTIVITY

BACKGROUND OF THE INVENTION

The present invention relates to a process of preparing an ion exchange membrane extensively employed in electrochemical industries.

An ion exchange resin is utilized in the form of a particle or a membrane, and the said ion exchange membrane is frequently employed as a diaphragm for industrial electrolysis, including saline solution electrolysis. The ion exchange membrane in recent years has attracted much attention in the application thereof to a fuel cell employing a solid polymer electrolyte membrane as an electrolyte.

Since the ion exchange membrane is generally employed in severe conditions, the chemically resistant membrane having a group of —$SO_3H$ and the like in the perfluoro-resin has been employed. It is, however, quite difficult to introduce a number of ion exchange groups into the resin while maintaining the softness of the polymer so as not to disadvantageously increase the resistance to ionic conductivity. Since voltage loss increases with an increase in the resistance of the membrane, a decrease in the resistance to ionic conductivity is a significant goal to be received for the development of improved electrolysis and fuel cells.

A transfer mechanism of an ion in the ion exchange membrane may be explained by means of the Following cluster structure model. The ion exchange functional groups having an equivalent weight of about 1000, gather to form a spherical cluster having a diameter of about 4 nm, and the adjacent clusters are connected by a fine path formed by ion exchange groups gathering together. The transfer of an anion and a cation occurs by means of water existing in the path. Even if such a cluster were actually present, only a small number of the ion exchange groups exist on a polymer chain and not all of the ion exchange groups exist in the cluster. If the existing ratio of the ion exchange groups in the cluster can be increased, the ionic conductivity increases to lower the voltage loss in the membrane so that the efficiencies of electrolysis and fuel cells increase.

A composition prepared by dissolving a perfluoro-resin in butanol using an autoclave is available for obtaining Nafion® type of composition having a sulphonic group as part of the perfluorinated hydrocarbon polymer chain. This composition is employed as a laboratory reagent, an electrolyte of a sensor and material for a fuel cell. However, the resistance to ionic conductivity of a membrane prepared by using this composition by means of a casting method is higher than that of commercially available Nafion® membranes. This is probably because the cluster structure of the membrane prepared from the composition is inferior to of the commercially available Nafion® membrane. The performance of the sensor and the fuel cell can be improved if a cluster structure is obtained which is the same as or superior to that of commercially available membranes.

SUMMARY OF THE INVENTION

In view of the above drawbacks, an object of the present invention is to provide a process of preparing an ion exchange membrane having similar performance to that of commercially available Nafion® membranes.

Another object is to provide a process of preparing an ion exchange membrane having increased ionic conductivity.

The present invention is a process of preparing an ion exchange membrane which comprises adding a highly hydrophilic solvent into a solution of an ion exchange resin containing an ion exchange group on the polymer chain, placing the solution into a membrane-forming vessel and forming a membrane by removing the solvent.

DETAILED DESCRIPTION OF THE INVENTION

Since, in the process of preparing the ion exchange membrane of the present invention, a hydrophilic solvent, preferably water and an alcohol having higher hydrophilicity than that of butanol, is employed as the solvent for a solution in which an ion exchange resin containing an ion exchange group on a polymer chain is dissolved or dispersed, the degree of orientation of the ion exchange group in the cluster increase as as a result of the solvent effect, so as to lower the conductivity resistance and to increase the ionic conductivity.

Since the polymer backbone, for example, a hydrocarbon long chain, especially, a fluorinated or perfluorinated hydrocarbon long chain exhibits a strong hydrophobic character and the ion exchange group exhibits hydrophilicity, the strongly hydrophilic alcohol or water which is water added has no affinity for the fluorinated hydrocarbon long chain, but rather has affinity for the ion exchange group. The separation of the fluorinated hydrocarbon long chain and the ion exchange group occurs by means of the effect of the added alcohol or water, as mixed oil and water separate into two pleases, to increase the degree of the orientation for gathering more ion exchange groups in the cluster so that the resistance decreases or the ionic conductivity increases.

The ion exchange resin employed in the invention includes a hydrocarbon resin and a partially or completely halogenated, especially, fluorinated hydrocarbon resin having one or more ion exchange groups such as a sulphonic acid group (—$SO_3H$), a carboxylic acid group (—COOH) and an ammonium group (—$NH_4^+$).

The solvent employed in the invention includes water and an alcohol, preferably of which hydrophilicity is higher than that of butanol, such as methanol, ethanol, propanol and 2-propanol.

EXAMPLES

Although Example of preparing the ion exchange membrane in accordance with the process of the present invention will be described, this Example is not construed to restrict the invention.

Example 1

After butanol in 5% in Nafion (trademark) solutions was removed under a reduced pressure until the volume thereof reached to one-third of the original volume, the same weight of methanol, ethanol, 2-propanol and ethylene glycol as that of the removed butanol was separately added to the respective solutions. After the solution was stirred, the solution was poured into a membrane-forming vessel and was removed by drying. The ion exchange membrane thus prepared having a thickness of 0.1 mm was placed between a gas diffusion anode and a gas diffusion cathode and hotpressed at 150° C. and 5 kg/cm for integrating the membrane and the electrodes.

For comparison, three other membranes, that is, a conventional ion exchange membrane Nafion 117, Nafion 115 and one prepared from the above commercially available butanol solution of Nafion were employed and were integrated with the same gas diffusion electrodes.

Figure 1:
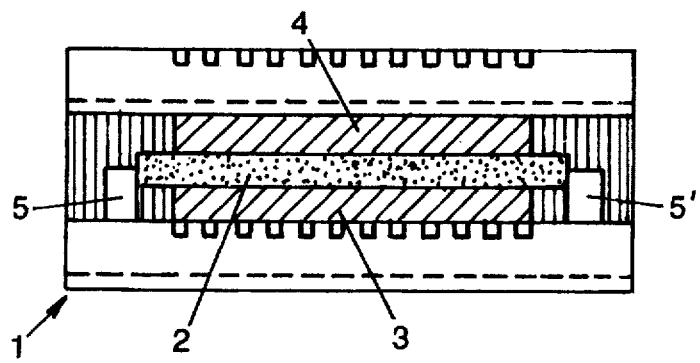
FIG. 1 shows a test cell for measuring a resistance of ionic conductivity of an ion exchange membrane.

The ionic conductivity resistances of these ion exchange membranes were measured employing a test cell 1 shown in FIG. 1 in accordance with a current interrupting method under the same conditions of an ordinary hydrogen-oxygen solid polymer electrolyte (SPE) cell, that is, under the conditions of wetting a hydrogen gas by supplying water vapor at a temperature higher than an operation temperature by 10° C.

The test cell 1 was formed by an ion exchange membrane 2 interposed between an anode 3 and a cathode 4 and water was added from a water supply port 5 for wetting the membrane 2 and a reaction gas and discharged from a water discharge port 5'.

Figure 2:
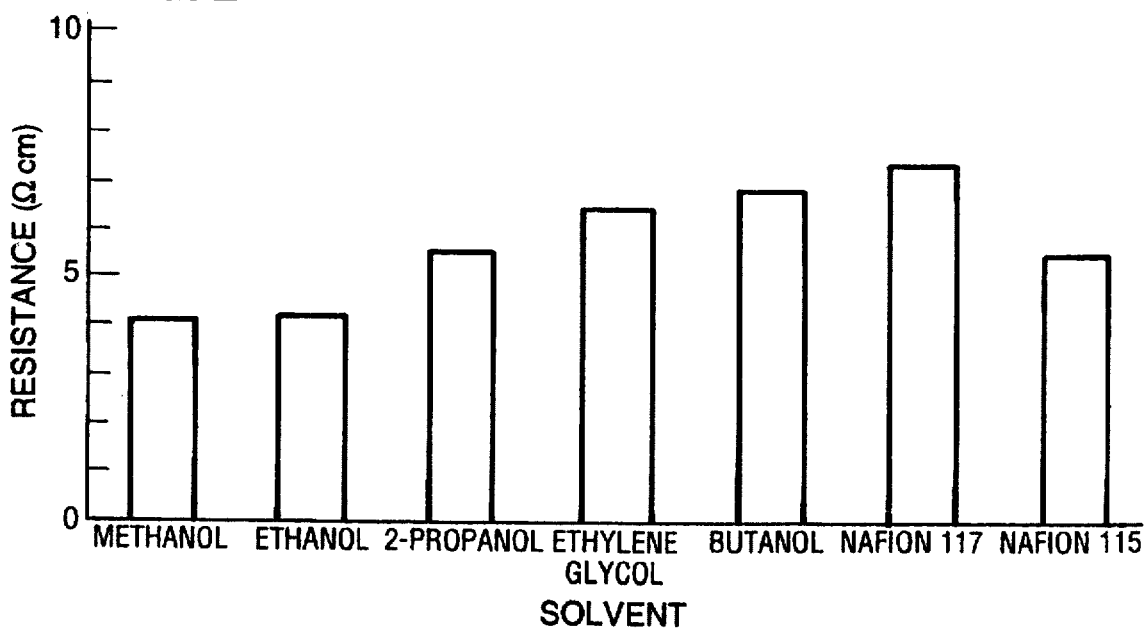
FIG. 2 shows a solvent effect on the resistance of ion conduction.
Figure 3:
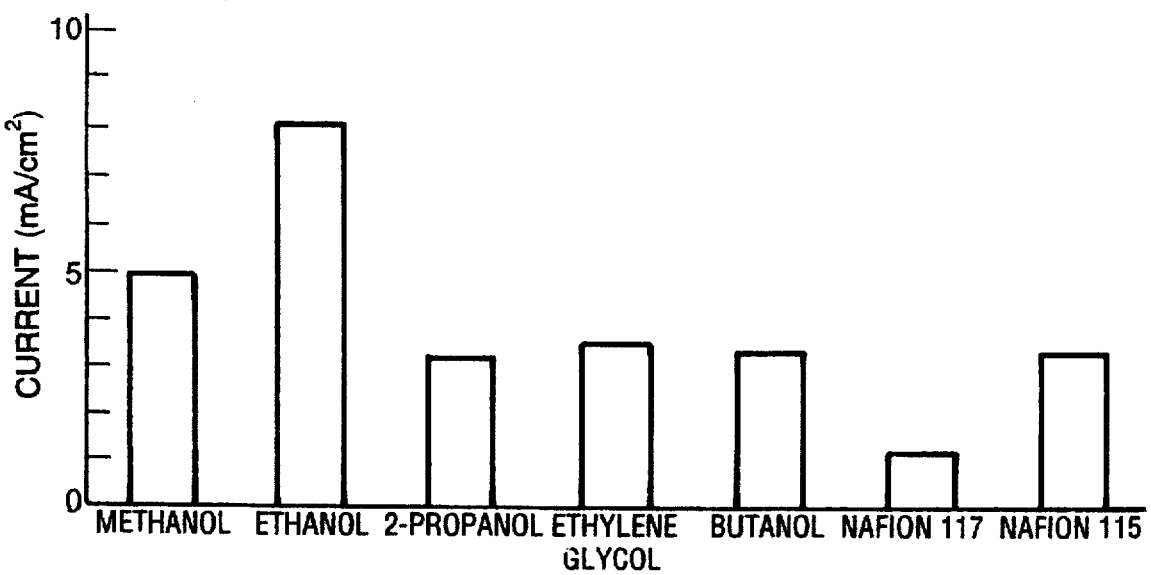
FIG. 3 shows a solvent effect on the current density at an IR corrected cell voltage of 800 mV.

The results are shown in FIGS. 2 and 3. The resistance of ion conduction for the membrane prepared with methanol, ethanol and 2-propanol is lower than that of conventionally available Nafion 117 and 115 and the one prepared with the other solvents. Also, IR free cell performance or the membrane with methanol and ethanol is much increased compared with the others. These results indicate that by employing a hydrophilic solvent such as a lower alcohol, ion conductivity is successfully modified.

What is claimed is:

1. A process of preparing an ion exchange membrane which comprises adding a highly hydrophilic solvent selected the group consisting essentially of methanol, ethanol, 2-propanol and ethylene glycol to a mixture of butanol and sufficient ion exchange resin to prepare said membrane, placing the resultant mixture in a membrane-forming vessel and forming the membrane by removing the solvent from said resultant mixture;

wherein said ion exchange resin comprises a perfluorinated hydrocarbon resin having sulphonic acid groups as a constituent part thereof; and wherein said resin has decreased resistance to ionic conductivity as a result of its preparation as set out above.

2. A process according to claim 1 wherein before the addition of the highly hydrophilic solvent, the mixture of butanol and ion exchange resin is treated to remove up to two-thirds of the volume of butanol therefrom.

3. An ion exchange membrane prepared by a process which comprises adding a highly hydrophilic solvent selected from the group consisting essentially of methanol, ethanol, 2-propanol and ethylene glycol to a mixture of butanol and sufficient ion exchange resin to prepare said membrane, placing the resultant mixture in a membrane-forming vessel, and forming said ion exchange membrane by removing the solvent from said resultant mixture;

wherein said ion exchange resin comprises perfluorinated hydrocarbon resin having sulphonic acid groups as a constituent part thereof; and wherein said resin decreased resistance to ionic conductivity as a result of its preparation as set out above.

4. An ion exchange membrane according to claim 3 wherein before the addition of the highly hydrophilic solvent, the mixture of butanol and ion exchange resin is treated to remove up two-thirds of the volume of butanol therefrom.

* * * * *